(12) United States Patent
Wang

(10) Patent No.: US 7,447,905 B2
(45) Date of Patent: Nov. 4, 2008

(54) SYSTEM AND METHOD OF UNACKNOWLEDGED NETWORK LAYER SERVICE ACCESS POINT IDENTIFIER (NSAPI) RECOVERY IN SUB-NETWORK DEPENDENT CONVERGENCE PROTOCOL (SNDCP) COMMUNICATION

(75) Inventor: Charles Wang, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 806 days.

(21) Appl. No.: 10/715,693

(22) Filed: Nov. 18, 2003

(65) Prior Publication Data

US 2004/0156331 A1 Aug. 12, 2004

Related U.S. Application Data

(60) Provisional application No. 60/427,239, filed on Nov. 19, 2002.

(30) Foreign Application Priority Data

Nov. 25, 2002 (EP) ................................ 02026390

(51) Int. Cl.
*H04Q 7/00* (2006.01)
(52) U.S. Cl. .................... 713/160; 370/328; 370/349
(58) Field of Classification Search ................ 713/160
See application file for complete search history.

(56) References Cited

U.S. PATENT DOCUMENTS

| | | | |
|---|---|---|---|
| 6,097,731 A | 8/2000 | Aoki | |
| 6,385,451 B1 * | 5/2002 | Kalliokulju et al. | 455/437 |
| 6,434,133 B1 * | 8/2002 | Hamalainen | 370/338 |
| 6,463,055 B1 * | 10/2002 | Lupien et al. | 370/353 |
| 6,512,756 B1 * | 1/2003 | Mustajarvi et al. | 370/341 |
| 6,717,925 B1 * | 4/2004 | Leppisaari et al. | 370/312 |
| 2002/0107019 A1 | 8/2002 | Mikola et al. | |
| 2004/0053623 A1 * | 3/2004 | Hoff et al. | 455/452.1 |
| 2004/0210559 A1 * | 10/2004 | Qvigstad | 707/2 |

FOREIGN PATENT DOCUMENTS

WO WO-02/17651 A1 2/2002

OTHER PUBLICATIONS

ETSI TS 101 297 V8.2.0 (Sep. 2001)—Digital cellular telecommunications system (Phase 2+).
ETSI TS 101 351 v8.7.0 (Dec. 2001)—Digital cellular telecommunications system (Phase 2+).
European Patent Office, Examination Report for corresponding European Application No. 07100490.7, Aug. 21, 2008.

* cited by examiner

*Primary Examiner*—Matthew B Smithers
(74) *Attorney, Agent, or Firm*—Borden Ladner Gervais LLP; Jeffrey W. Wong

(57) ABSTRACT

A system and method of unacknowledged Network Layer Service Access Point Identifier (NSAPI) recovery in Sub-Network Dependent Convergence Protocol (SNDCP) communication are disclosed herein. The disclosed techniques prevent the loss of data which may result from changing between GPRS/GSM modes in a Class B mobile station (MS).

15 Claims, 7 Drawing Sheets

SYSTEM AND METHOD OF UNACKNOWLEDGED NETWORK LAYER SERVICE ACCESS POINT IDENTIFIER (NSAPI) RECOVERY IN SUB-NETWORK DEPENDENT CONVERGENCE PROTOCOL (SNDCP) COMMUNICATION

CROSS-REFERENCE TO RELATED APPLICATION

This application claims priority from and is related to the following prior applications: System And Method Of Unacknowledged Network Layer Service Access Point Identifier Recovery In Subnetwork Dependent Convergence Protocol Communication, U.S. Provisional Application No. 60/427,239, filed Nov. 19, 2002; and System And Method Of Unacknowledged Network Layer Service Access Point Identifier Recovery In Subnetwork Dependent Convergence Protocol Communication, European Patent Application No. 02026390.1, filed Nov. 25, 2002. These prior applications, including the entire written description and drawing figures, are hereby incorporated into the present application by reference.

BACKGROUND

1. Field of the Technology

The present application relates generally to data communications for mobile communication devices. More particularly, the application relates to unacknowledged Network Layer Service Access Point Identifier (NSAPI) recovery for Sub-Network Dependent Convergence Protocol (SNDCP) communication in General Packet Radio Service (GPRS) networks.

2. Description of the Related Art

A mobile station (MS) may communicate in standardized networks such as Global System for Mobile (GSM) or General Packet Radio Service (GPRS) networks. In order to communicate data and voice, a MS may need to operate in accordance with both GSM and GPRS technologies. A Class B MS is a dual mode MS that can communicate in either GSM mode for voice or in GPRS mode for data—but not in both modes simultaneously. In GPRS mode, a Class B MS depends on protocols layered as a stack; network infrastructure nodes have corresponding stacks to thereby enable communications between the MS and various nodes and networks. $3^{rd}$ Generation Partnership Project (3GPP) standard document 24.007 (European Telecommunications Standards Institute (ETSI) Technical Specification (TS) 124 007 V4.1.0 (2001-12)) section 5.2 describes the GPRS protocol stack architecture diagram. GSM and GPRS share certain lower protocol layers, such as the GSM radio frequency (RF) layer.

GSM and GPRS techniques are known to those skilled in the art, as well as are some of their deficiencies. One such deficiency is related to the resetting of one of the protocol stack layers, namely, the Logical Link Control (LLC) layer. GSM standard document 04.464 (ETSI TS 101 351 V8.3.0 (2000-03)) section 8.5.3.1 details the negotiation of parameter Reset in the LLC. There, it explicitly specifies that the LLC shall discard requests pending from layer-3 to logical link entities (LLEs) with no further action.

Unfortunately, important user information may be lost as the LLC discards the pending requests. This happens particularly when using unacknowledged Network Layer Service Access Point Identifier (NSAPI) communication over Sub-network Dependent Convergence Protocol (SNDCP) communications. 3GPP standard document 04.65 (ETSI TS 101 297 V8.2.0 (2001-09)) section 5.1.2.1 describes what the GPRS SNDCP layer must do when it receives a logical link reset indication (LL.RESET.indication). Note that the standard is very explicit about what the SNDCP should do upon receiving the LL reset indication if the NSAPI is using acknowledged LLC operation.

The fact that a Class B MS can operate only in one mode at a given time (either GSM or GPRS mode) makes a Class B MS particularly vulnerable to this LLC reset deficiency. In particular, an LLC reset occurs when changing from the GPRS mode to the GSM mode. The process of changing modes from data to voice and back can occur on many occasions during the normal use of a MS (e.g. due to network coverage inadequacies), occasionally causing data to be lost within the MS stack over the time of operation of the MS. The GPRS and GSM standards remain silent on how to recover from adverse effects of such mode changes, resulting in some implementations of the standard exhibiting data loss at a MS. As the ability to communicate data decreases, so does the utility of the MS. The time of operation of the MS can be drastically curtailed by improperly losing data within the protocol layers of the MS stack.

Accordingly, there remains a need for a system and method of unacknowledged NSAPI recovery in SNDCP communication that overcomes the limitations present in the current Class B MSs which cooperate with existing standards. There remains a further need for a system and method of unacknowledged NSAPI recovery in SNDCP communication that systematically recovers from transitions between GPRS and GSM modes in a Class B MS.

SUMMARY

It is an object to obviate or mitigate at least one disadvantage of previous dual mode Global System for Mobile Communications (GSM)/General Packet Radio Service (GPRS) Class B mobile station (MS) techniques. It is a further object to provide a system and method of unacknowledged Network Layer Service Access Point Identifier (NSAPI) recovery in Sub-network Dependent Convergence Protocol (SNDCP) communication that is robust against GSM/GPRS mode transitions and provides reliable communications.

In one illustrative embodiment, a system includes a recovering layer-3 module and a layer-2 module. The recovering layer-3 module has a protocol interface for receiving data and multiplexing the data into requests; means for tracking outstanding requests to determine the status of the requests; request resending means for selectively resending outstanding requests upon reception of a layer-2 reset indication; and a layer-2 interface for transmitting the requests and receiving the layer-2 reset indication. The layer-2 module is connected to the layer-2 interface of the recovering layer-3 module and has a queue for queuing the requests received from the layer-3 module; means for acknowledging the recovering layer-3 module upon completion of the requests; means for indicating a reset condition to the recovering layer-3 module via the layer-2 reset indication of the layer-2 interface; and a layer-1 interface for transmitting the data to a layer-1 module. The layer-1 module is connected to the layer-2 module via the layer-1 interface for transmitting the data from a first component of the system to a second component of the system over a physical layer. Preferably, the above-described system is integrated into a handheld computing or communicating device.

In another illustrative embodiment, a method of unacknowledged Network Layer Service Access Point Identifier (NSAPI) recovery in Sub-network Dependent Convergence Protocol (SNDCP) communications is provided. The method may include the steps of detecting a layer-2 reset condition in layer-3; determining outstanding layer-3 to layer-2 requests for unacknowledged layer-2 communication; and resending outstanding layer-3 to layer-2 requests from layer-3 to layer-2. The method may also include either or both of the steps of, upon detection of the layer-2 reset condition in layer-3, setting unacknowledged layer-2 communication sequence numbers to zero in layer-3 and entering a recovery state in layer-3 for acknowledged layer-2 communications.

Advantageously, the above techniques may be applied within a GPRS Class B MS having dual mode (i.e. GPRS and GSM) capabilities. In further embodiments, the techniques are applied in a Universal Mobile Telecommunications System (UMTS) MS.

Other aspects and features will become apparent to those ordinarily skilled in the art upon review of the following description of specific embodiments in conjunction with the accompanying figures.

BRIEF DESCRIPTION OF THE DRAWINGS

Embodiments of the present invention will now be described, by way of example only, with reference to the attached figures, wherein.

DETAILED DESCRIPTION OF THE PREFERRED EMBODIMENTS

The present invention mitigates or obviates at least one disadvantage in previous Global System for Mobile (GSM)/General Packet Radio Service (GPRS) Class B mobile stations. A preferred system and method to provide reliable and robust data communications despite GSM/GPRS mode transitions are described herein, using unacknowledged Network Layer Service Access Point Identifier (NSAPI) recovery in Sub-Network Dependent Convergence Protocol (SNDCP) communications.

Figure 1:
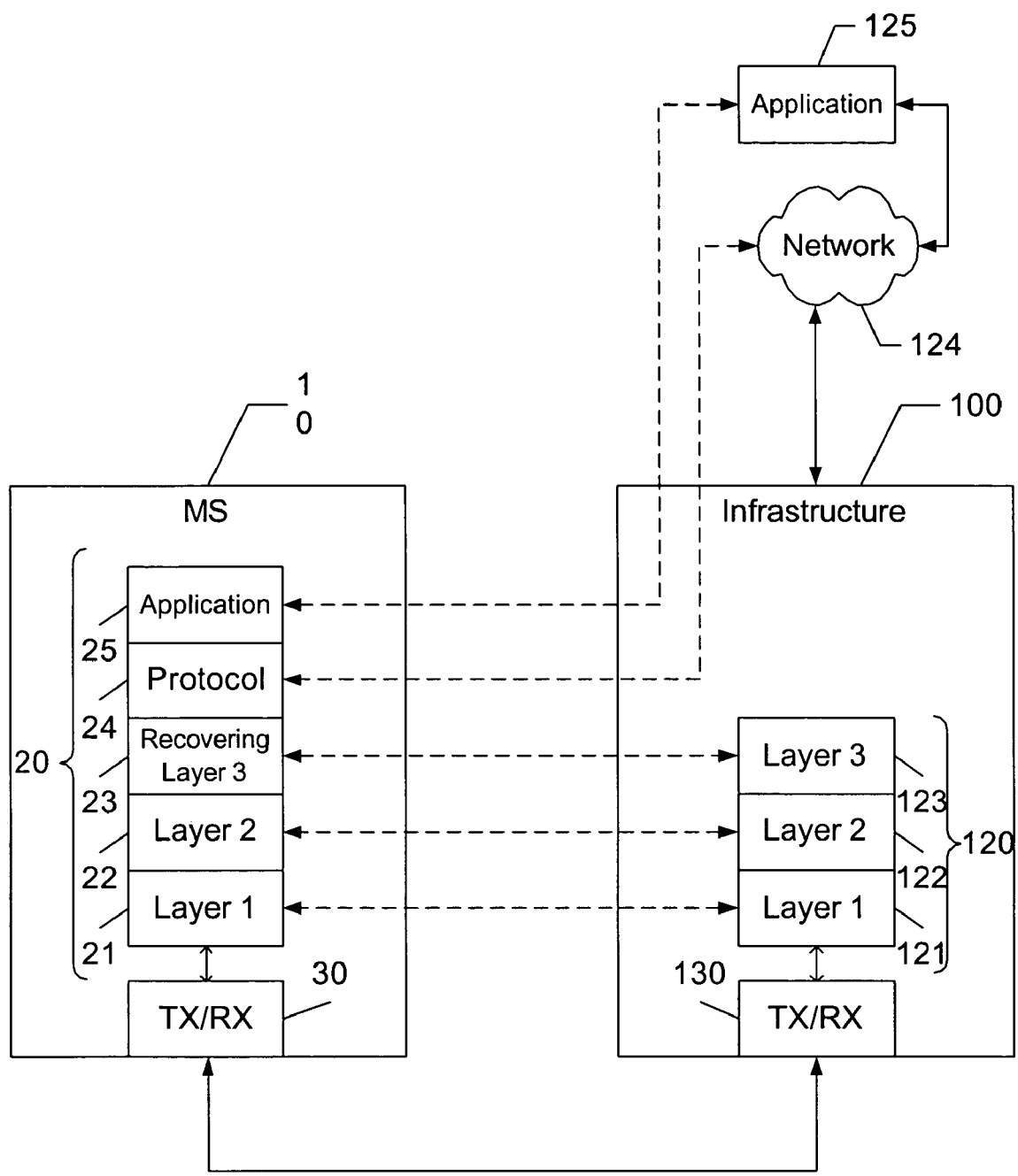
FIG. 1 illustrates a mobile station (MS) and an infrastructure of a network which may incorporate certain aspects of the present invention.

FIG. 1 illustrates particular aspects of a mobile station (MS) 10 and an infrastructure 100 of a network 124. A data application 25 on MS 10 features a recovering protocol stack 20 to a corresponding application 125 on network 124 via infrastructure 100. In the embodiment of FIG. 1, stack 20 includes 5 layers: a layer-1 21, a layer-2 22, a recovering layer-3 23, a protocol layer 24, and an application layer 25. Layer-1 21, layer-2 22, and layer-3 23 find correspondence in an infrastructure stack 120 of infrastructure 100 which includes a layer-1 121, a layer-2 122, and a layer-3 123, respectively. Transceivers 30 and 130 of MS 10 and infrastructure 100 ensure that information is appropriately transmitted and received over one or more physical communication channels (e.g. a wireless communication channel). Protocol layer 24 corresponds with the protocol used by network 124 beyond infrastructure 100. Application layer 25 corresponds to an application 125 which operates on top of network 124.

MS 10 typically operates in a data mode, but occasionally switches to a voice mode and back. Although MS 10 temporarily switches out of the data mode, data application 25 may continue to send data, which network application 125 eventually receives via infrastructure 100. The reason is the presence of recovering layer-3 23, which ensures that outstanding requests to layer-2 22 are properly retransmitted when MS 10 returns to the data mode. In this manner, data is not lost and communications are made more reliable, even when infrastructure layer-3 123 is configured not to acknowledge its reception of data from MS 10.

Figure 2:
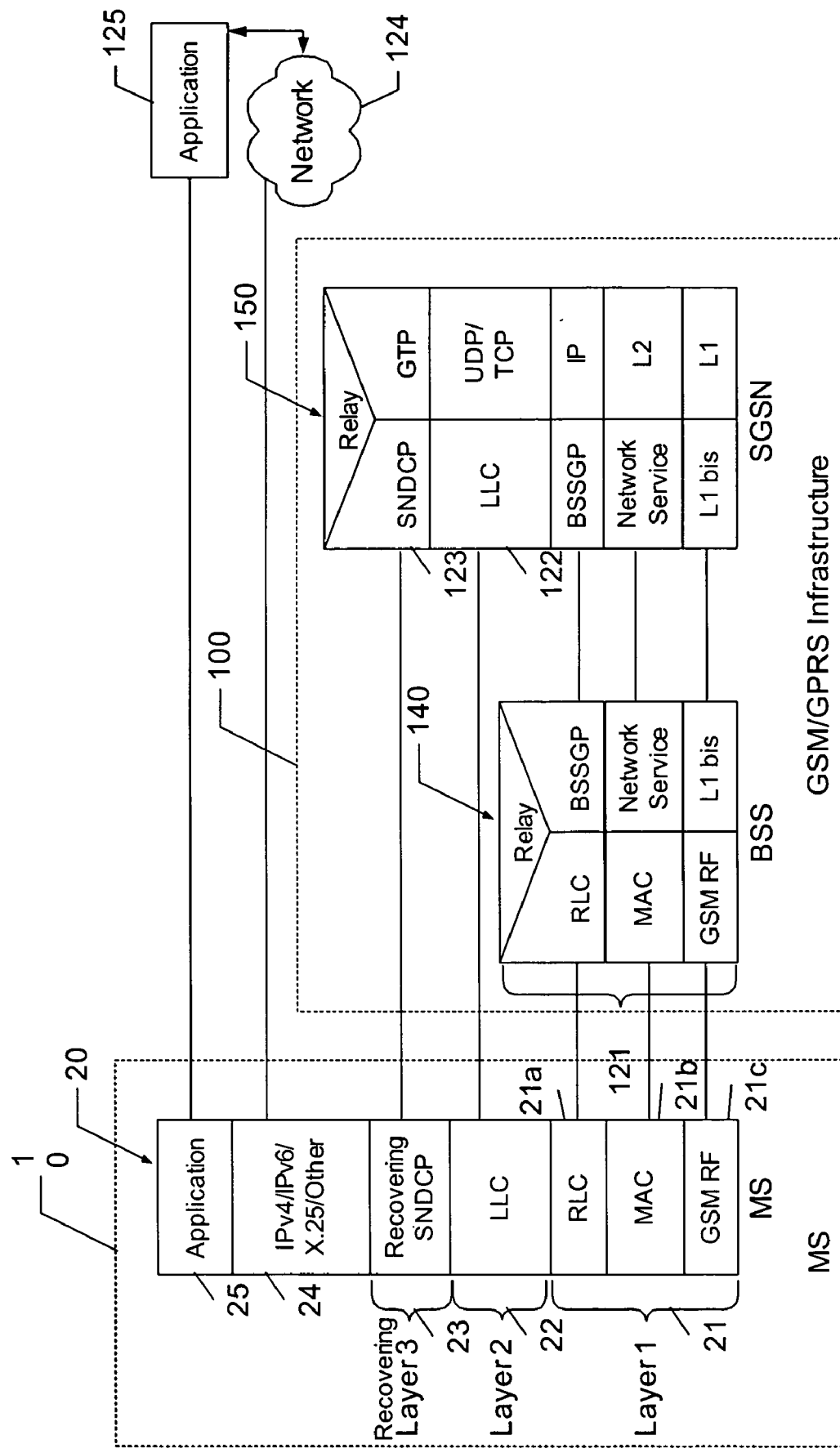
FIG. 2 illustrates the elements of the system of FIG. 1 when embodied as a General Packet Radio Service (GPRS) system.

Turning now to FIG. 2, the same elements of the system of FIG. 1 applied to a GPRS system are shown. Protocol stack 20 of MS 10 includes protocol layer 24 as well as application layer 25, configured as needed on a per protocol and application basis to correspond with network 124 and network application 125, respectively. Examples of protocol layer 24 include Internet Protocol (IP) Version 4 (IPv4), IP Version 6 (IPv6), and X.25; however, many other suitable protocols may be utilized. Examples of MS applications 25 and network applications 125 include e-mail, web browsing, and chat applications, as well as other suitable applications with a communication component which operates over protocol layer 24 and network 124.

Further down stack 20, layer-1 21 components are illustrated in more detail. In FIG. 2, layer-1 21 is implemented with three sub-layers including a media access control (MAC) 21a, a radio link control (RLC) 21b, and a GSM radio frequency (RF) 21c, each finding correspondence with infrastructure stack sub-layers of infrastructure layer-1 121. In an alternate embodiment, instead of using the GSM RF sub-layer 21c in particular and GSM components of layer-1 21 of FIG. 2 in general, Universal Mobile Telecommunications System (UMTS) layer-1 components and UMTS RF sub-layers are utilized.

Of particular interest, new recovering layer-3 23 of FIG. 2 is embodied in a recovering Sub-Network Dependent Convergence Protocol (SNDCP). Note that this is an improvement over traditional SNDCP. Also of interest is a traditional link layer control (LLC) layer-2 22, which provides services to recovering SNDCP layer-3 23. The structure and co-operation of recovering SNDCP layer-3 23 with LLC layer-2 22 will be described in greater detail with reference to FIGS. 3 and 4, respectively. Finally, infrastructure 100 of FIG. 2 has stack 120 split into two stacks, with layer-1 121 implemented in a base station system (BSS) 140, and layer-2 122 and layer-3 123 implemented in a serving GPRS support node (SGSN) 150.

Figure 3:
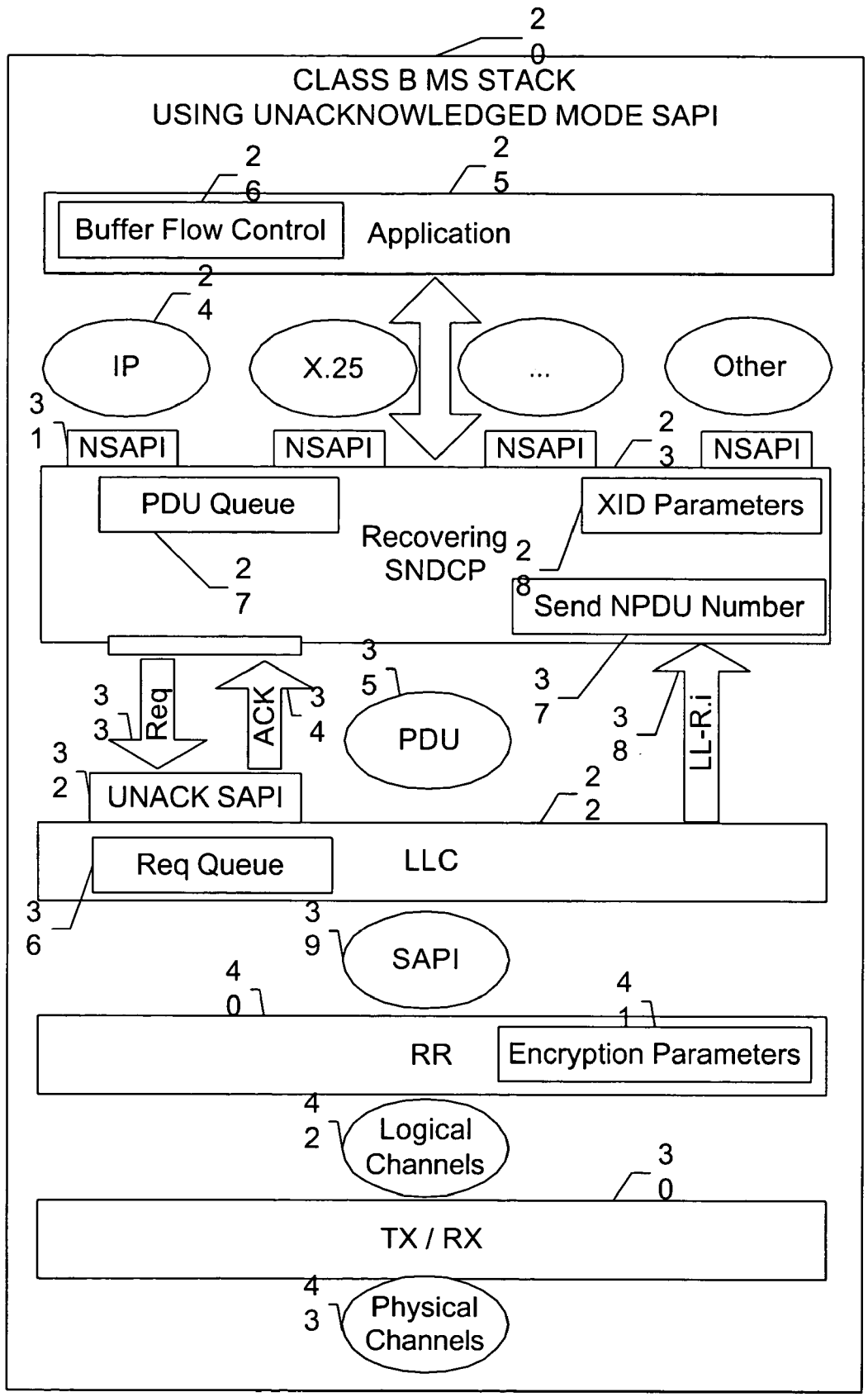
FIG. 3 illustrates in greater detail a recovering Sub-Network Dependent Convergence Protocol (SNDCP) layer and a Logical Link Control (LLC) layer for the system of FIG. 2.

Turning now to FIG. 3, recovering SNDCP layer-3 and LLC layer-2 stack components of FIG. 2 are shown in more detail. Application 25, such as an e-mail client or wireless access protocol (WAP) browser, uses protocol 24, such as IP, to send data to a corresponding network application (not shown in FIG. 3). The data is sent in a plurality of packet data units (PDUs) 35, which are indexed using a Network Layer Service Access Point Identifier (NSAPI) 31. Recovering SNDCP 23 (layer-3) multiplexes several NSAPIs into a single "unacknowledged" service access point identifier (UNACK SAPI) 32 provided by LLC 22.

As used herein, unacknowledged communication between a source and a destination is defined to mean that an acknowledgement need not be sent back to the source upon reception of the communication at the destination. Unacknowledged NSAPI is a term that is meant to include both NSAPIs that are configured for unacknowledged communication at a MS source, and NSAPIs at a MS source which use a SAPI in unacknowledged LLC operation mode at a MS source (such as an NSAPI that is logically linked to an LLC SAPI that operates in unacknowledged mode). Thus, as illustrated in FIG. 3, NSAPIs 31 are unacknowledged as they are logically linked to LLC SAPIs 32 that, as illustrated, operate in unacknowledged mode. Although not expressly shown in FIG. 3, LLC SAPIs can also operate in acknowledged mode and, when so configured, NSAPIs logically linked to acknowledged LLC SAPIs operate as acknowledged NSAPIs.

Recovering SNDCP 23 sends PDUs 35, each of which is initially buffered in a PDU queue 27, to LLC 22 in a series of requests 33. PDUs in PDU queue 27 are considered outstanding until an acknowledgement (ACK) 34 is received from LLC 22. 20 Note that ACK 34 is sent when LLC 22 has sent PDU 35, not when the infrastructure has received PDU 35 (as SAPI 32 is unacknowledged). PDUs 35 are sent by LLC 22 via SAPI 39 to the lower layers, such as sub-layer radio resource (RR) 40 which is responsible for applying encryption parameters 41 and setting up logical channels 42 which map to physical channels 43 of transceiver 30. Thus, in unacknowledged NSAPI communication, failure to receive ACK 34 at recovering SNDCP 23 from LLC 22 indicates that a corresponding request 33 has an unconfirmed transmission status. ACK 34 indicates to recovering SNDCP 23 that one or more requests 33 have been transmitted by LLC 22.

When LLC 22 is reset, it sends an LL-RESET.indication (LL-R.i) 38 to recovering SNDCP 23. Possible reasons for receiving LL-R.i 38 include MS 10 performing a GSM task and/or suspending GPRS service, or MS 10 performing a routing area network update. This results in a reset exchange identification (XID) command being received by LLC 22 after it buffers one or more SNDCP-to-LLC requests 33 in a request queue 36. An example of a GSM task is a location area update by the MS, after which GPRS service could be suspended even though a GPRS task (e.g. sending an e-mail message) may be being performed.

In accordance with conventional methods, LLC 22 is required to flush queue 36 without further action immediately prior to sending LL-R.i. 38. Furthermore, upon reception of LL-R.i 38 in unacknowledged operation, the SNDCP is required to: (1) treat all outstanding SNDCP-LLC request type primitives as not sent; (2) reset all SNDCP exchange identification (XID) parameters 28 to their default values; and (3) for every NSAPI using unacknowledged peer-to-peer LLC operation, set the send N-PDU number 37 (unacknowledged) to zero (0). The recovery aspect in recovering SNDCP 23 goes further by resending all outstanding PDUs in queue 27 after renumbering them in accordance with the newly established NPDU number 37 sequence starting with zero. Thus, without the recovering aspect of recovering SNDCP 28, the outstanding PDUs either never get sent or get sent with improper sequence numbers. SNDCP-to-LLC requests can include LLC XID requests as well as PDUs.

Figure 4:
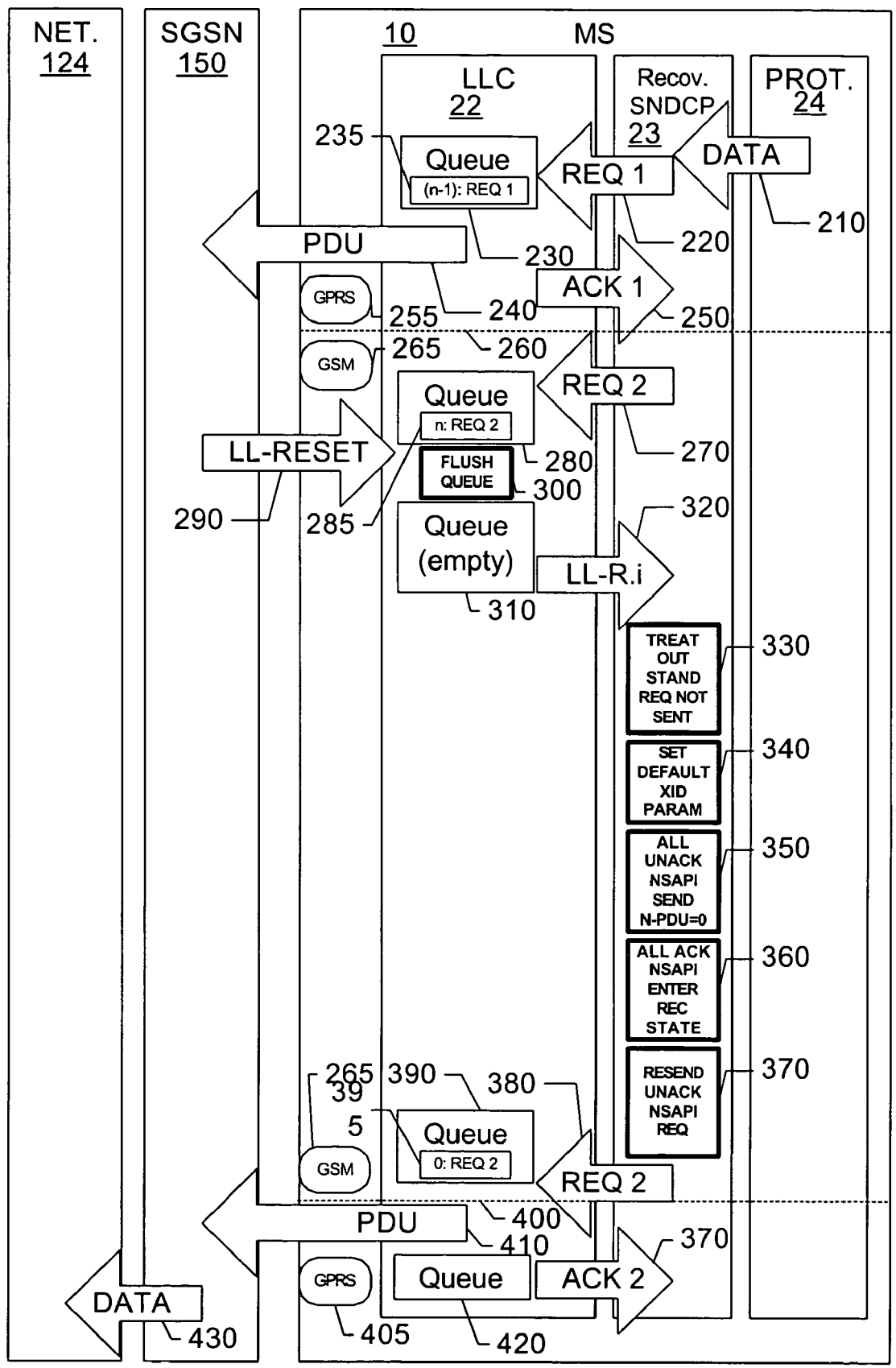
FIG. 4 is a signalling diagram illustrating the timing of communications between the MS and the infrastructure of FIGS. 2-3.

Referring now to FIG. 4, a signaling diagram illustrating the timing of communications between MS stack 20 and infrastructure 100 of FIGS. 2-3 is shown. In FIG. 4, time flows generally from top to bottom. MS 10 is initially operating in a GPRS mode 255. Protocol layer 24 sends data 210 to recovering SNDCP 23. Data 210 is protocol and application dependent, and is configured to operate on network 124 and with network application 125 (FIG. 2).

Recovering SNDCP 23 transmits data 210 to LLC 22 in a series of requests, such as a REQ 1 220, which are queued 230 as required. Each queued request has a send N-PDU sequence number, illustrated as (n-1) for queued request 235 which corresponds to REQ 1 220. LLC 22 transmits such queued requests via PDUs, such as a PDU 240, which corresponds to queued request 235. Upon completion of the transmission, LLC 22 sends an ACK-1 250 back to recovering SNDCP 23. Note that ACK-1 250 was not sent from SGSN 150, but rather originated from LLC 22 thereby illustrating that PDU 240 was sent using unacknowledged NSAPI. Also note that PDU 240 was sent while MS 10 was operating in GPRS mode 255.

At some point in time before all of data 210 has been sent as PDUs to SGSN 150 indicated by a dotted line 260, MS 10 changes its operating mode from GPRS mode 255 to a GSM mode 265. One or more subsequent requests 270 made by recovering SNDCP 23 to LLC 22 become queued 280. Each queued request in GSM mode 265, including a queued request 285 corresponding to request REQ 2 270, cannot be sent. While recovering SNDCP 23 waits for an acknowledgement from LLC 22, LLC 22 receives an LL-RESET 290 from SGSN 150. In response to LL-RESET 290, LLC 22 is required to flush queue 300 without taking further action. With an empty queue 310, LLC 22 is required to send an LL-RESET.indication 320 to recovering SNDCP 23.

Upon reception of LL-RESET.indication 320, recovering SNDCP 23 is traditionally required to perform steps 330 through 360. At step 330, recovering SNDCP 23 treats all outstanding SNDCP-LLC request type primitives as not sent; at step 340 recovering SNDCP resets all SNDCP XID parameters to their default values; at step 350 recovering SNDCP 23 sets the send N-PDU number 37 (unacknowledged) to zero (0) for every NSAPI using unacknowledged peer-to-peer LLC operation; and if acknowledged communication is also supported by recovering SNDCP 23 at step 360, for every NSAPI using acknowledged peer-to-peer LLC operation, enter the recovery state and suspend the transmission of SN-PDUs until an SNSM-SEQUENCE.indication primitive is received for the NSAPI.

Recovering SNDCP 23 also performs a non-traditional step 370 at which recovering SNDCP 23 resends unacknowledged NSAPI requests which are outstanding. This is done using the new sequence numbers for the send PDUs after performing step 350. Step 370 ensures that the PDUs do not remain in recovering SNDCP 23, thereby ensuring that they no longer take up memory. After step 370, recovering SNDCP 23 recovers from the adverse effects of LL-RESET 290 at LLC 22: a request REQ 2 380 recovers where REQ 2 270 failed. When LLC 22 queues 390 the resent request REQ 2 380, a queued request 395 now contains the correct sequence number (0) whereas the previous queued request 285 corresponding to REQ 2 270 contained the wrong sequence number (n).

At some point at a time 400, MS 10 returns from operating in GSM mode 265 to operate again in a GPRS mode 405. After time 400, PDUs 410 corresponding to queued requests 395 are sent by LLC 22 to SGSN 150, thereby completing the transmission of data 210 from MS 10 to SGSN 150, which then transmits data 430 to network 124.

Figure 5:
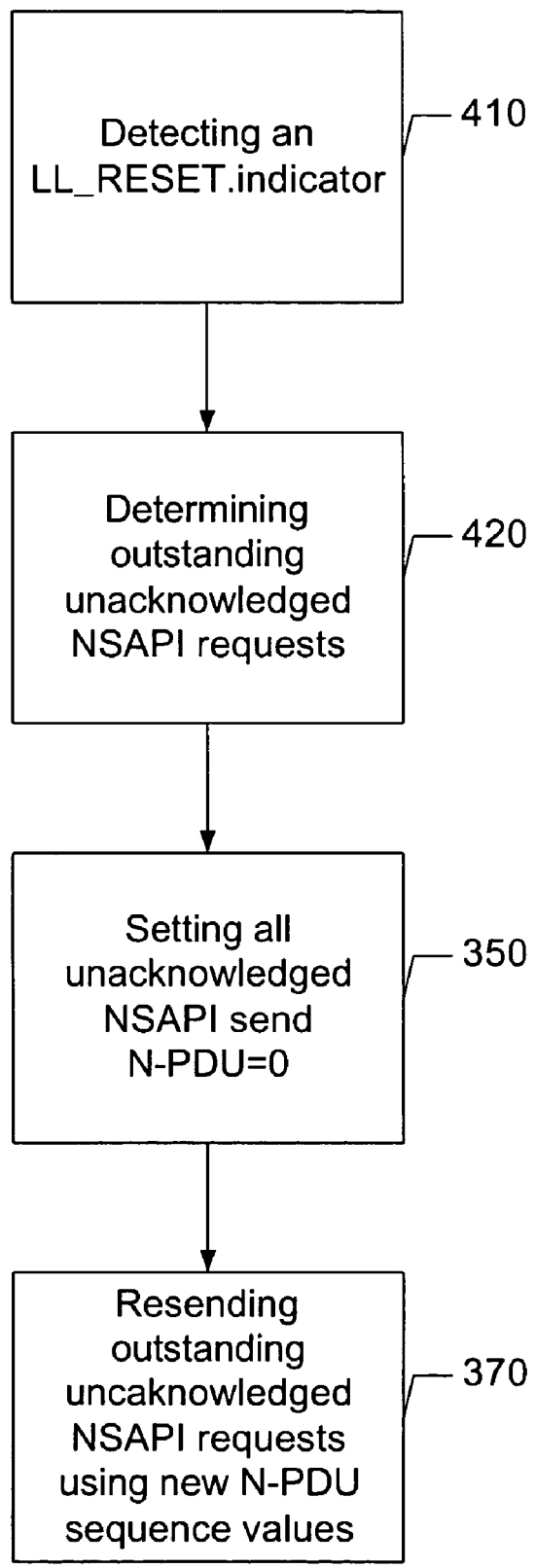
FIG. 5 is a flowchart illustrating a method of unacknowledged Network Layer Service Access Point Identifier (NSAPI) recovery in SNDCP communications.

Referring to FIG. 5, a flowchart for a method of unacknowledged NSAPI recovery for SNDCP communication is shown. At step 410 of FIG. 5, an LL-RESET.indicator from the LLC is identified at the recovering SNDCP. At step 420, the recovering SNDCP identifies any outstanding unacknowledged NSAPI requests which have been sent to the LLC by the recovering SNDCP, but not acknowledged by the LLC. At step 350, for each unacknowledged NSAPI, the recovering SNDCP sets the N-PDU sequence number to zero. At step 370, the recovering SNDCP resends the outstanding unacknowledged NSAPI requests using the new N-PDU sequence numbers set at step 350 to start each outstanding request sequence.

Figure 6:
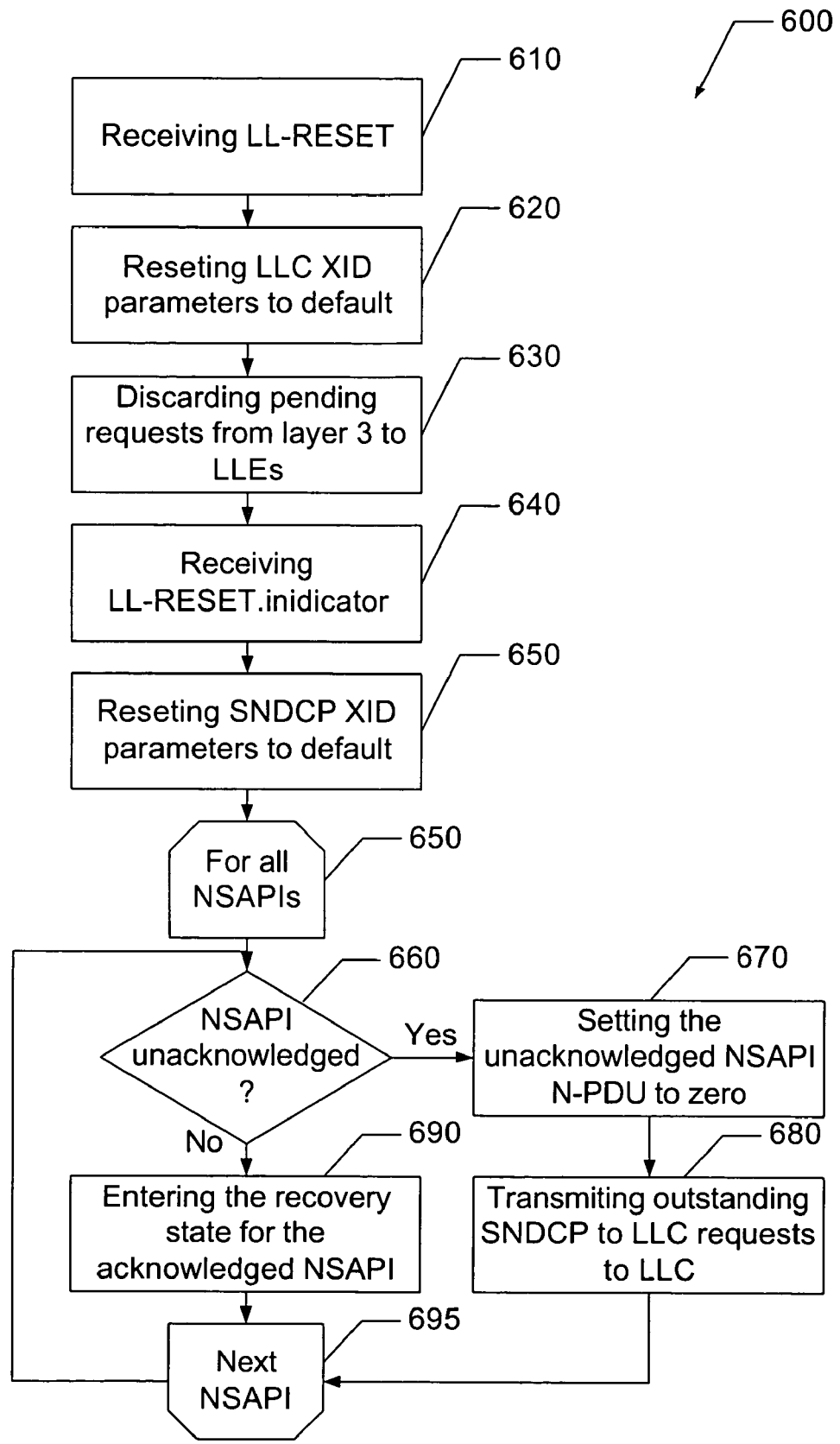
FIG. 6 is a flowchart illustrating another method of unacknowledged NSAPI recovery in SNDCP communication.

Referring to FIG. 6, a flowchart for another exemplary method of unacknowledged NSAPI recovery for SNDCP communication is shown. At step 610, an LL-RESET command is received at an LLC in an MS. At step 620, all LLC XID parameters are reset to their default values. At step 630, all requests that are pending from a layer-3 communication layer to a plurality of LLEs are discarded. At step 640, a logical link reset indication (LL-RESET.indication) is received at an SNDCP from the LLC. In response to the LL-RESET-indication all SNDCP XID parameters are reset to their default values at step 650. In addition, at step 660 it is determined whether the NSAPI currently being processed is unacknowledged. If the NSAPI is unacknowledged, then steps 670 and 680 ensue whereas step 690 ensues otherwise. At step 670, for every NSAPI using unacknowledged peer-to-peer LLC operation, a sequence number of the next network packet data unit (N-PDU) is set to zero. At step 680, if the NSAPI is using unacknowledged peer-to-peer LLC operation, outstanding SNDCP-to-LLC requests are transmitted to the LLC. At step 690, for every NSAPI using acknowledged peer-to-peer LLC operation, the recovery state is entered and the transmission of SN-PDUs is suspended until an SNSM-SEQUENCE.indication primitive is received for the NSAPI. At step 695 it is determined if all NSAPIs have been processed and, if not, the next NSAPI is taken thru steps which follow step 650.

Figure 7:
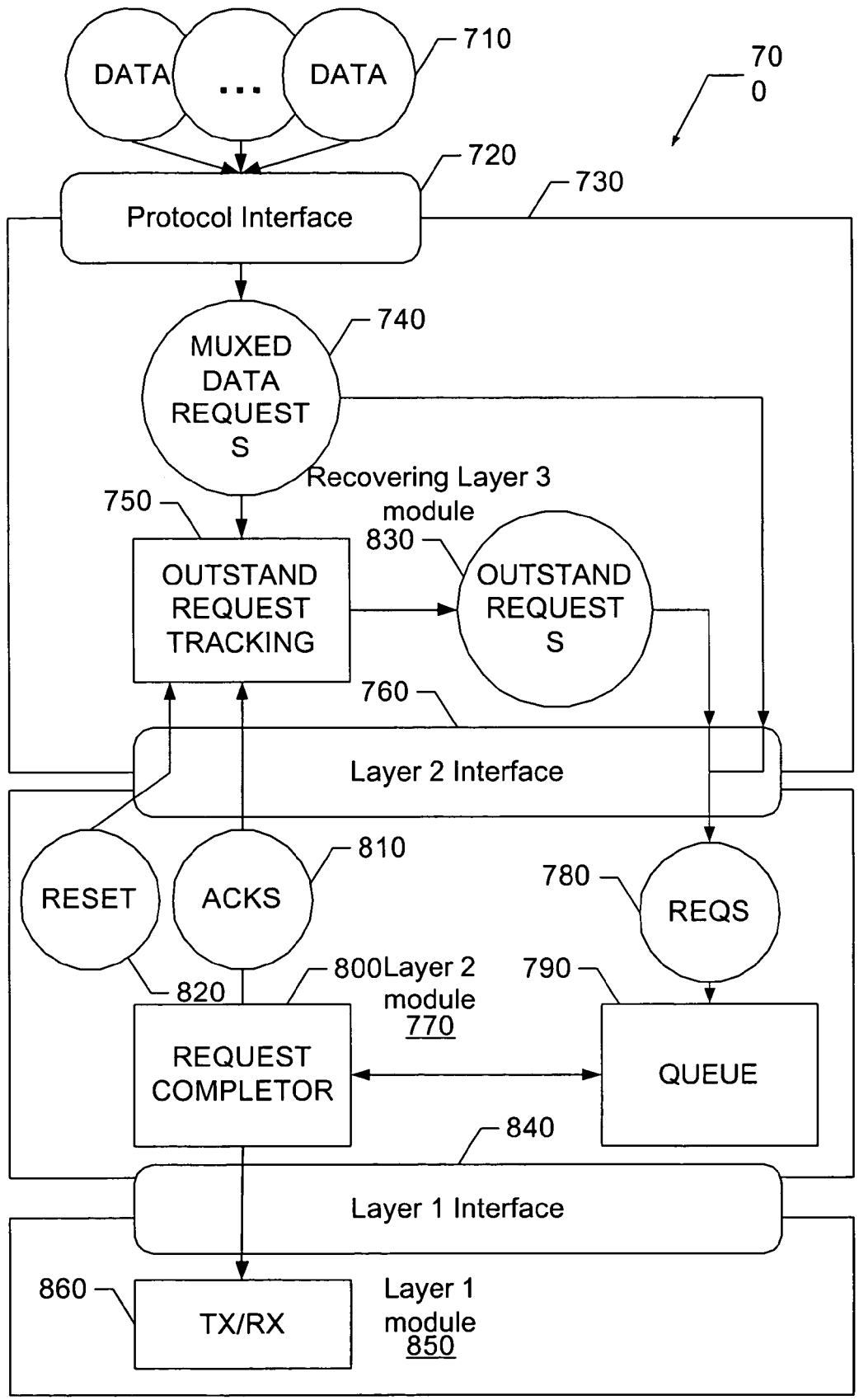
FIG. 7 is a block diagram illustrating another exemplary embodiment of a system which may incorporate certain aspects of the present invention.

FIG. 7 is a block diagram illustrating another embodiment of an exemplary system which may incorporate aspects of the present invention. A system 700 includes a recovering layer-3 module 730 connected via a layer-2 interface 760 to a layer-2 module 770. Layer-2 module 770 is connected via a layer-1 interface 840 to a layer-1 module 850. Recovering layer-3 module 730 has a protocol interface 720 for receiving data 710 and multiplexing the data 710 into requests 740. Recovering layer-3 module 730 also has an outstanding request tracking component 750 to determine the status of the requests and selectively resending outstanding requests 830 upon reception of a layer-2 reset 820 indication. Layer-2 interface 760 is used for transmitting requests 740, 830 and for receiving layer-2 reset indication 820.

Layer-2 module 770 has a queue 790 for queuing requests 780 received from layer-3 module 730. Layer-2 module 770 ordinarily acknowledges 810 recovering layer-3 module 730 upon completion 800 of requests 780. Layer-2 module 770 also indicates when a reset condition occurs to recovering layer-3 module 730 via layer-2 reset indication 820. Typically, when a reset condition occurs, queue 790 is flushed; therefore recovering layer-3 module 730, upon detection of reset condition 820, resends any outstanding requests 830 which have not been acknowledged by layer-2 module 770. Layer-1 module 850 is connected to layer-2 module 850 via layer-1 interface 840 for transmitting data 710 from a first component of a larger system, such as system 700, to a second component of a larger system (not shown) over a physical layer.

As apparent, the above-described methods and systems mitigate the loss of data resulting from transitions between the GSM/GPRS modes in a Class B MS. The above-described embodiments of the invention are intended to be examples only. Alterations, modifications, and variations may be effected to the particular embodiments by those of skill in the art without departing from the scope of the invention, which is defined solely by the claims appended hereto.

What is claimed is:

1. A method, comprising:
   receiving a reset exchange identification (XID) command at a Logical Link Control (LLC) of a mobile station (MS);
   resetting all LLC XID parameters to their default values;
   discarding all requests that are pending from a layer-3 communication layer to a plurality of logical link entities (LLEs);
   receiving a logical link reset indication (LL-RESET-indication) from the LLC at a Sub-Network Dependent Convergence Protocol (SNDCP) layer; and
   upon receipt of the LL-RESET-indication, the performing the following acts at the SNDCP:
      resetting all SNDCP XID parameters to their default values;
      for every network service access point identifier (NSAPI) using unacknowledged peer-to-peer LLC operation, setting a sequence number of the next network packet data unit (N-PDU) to be sent by the SNDCP to zero;
      if the NSAPI is using unacknowledged peer-to-peer LLC operation, then:
         transmitting outstanding SNDCP-to-LLC requests to the LLC.

2. The method of claim 1, comprising the further acts of:
   before receiving the XID command:
      performing a GSM task;
      suspending GPRS service; and
      buffering the one or more SNDCP-to-LLC requests in the LLC.

3. The method of claim 2, comprising the further acts of:
   performing a routing area network update, thereby resulting in the reset XID command being received by the LLC after the buffering by the LLC of the one or more SNDCP-to-LLC requests.

4. The method of claim 2, wherein the act of performing a GSM task comprises performing a MS location area update, the method further comprising the act of:
   performing a GPRS task by the MS after suspending the GPRS service.

5. The method of claim 2, wherein the GPRS task comprises sending an electronic mail (e-mail) message.

6. The method of claim 1, wherein the SNDCP-to-LLC requests include logical link unit data requests.

7. The method of claim 1, wherein the SNDCP-to-LLC requests comprise logical link XID requests.

8. A method of resetting Sub-Network Dependent Convergence Protocol (SNDCP) reset exchange identification (XID) parameters, initializing SNDCP unacknowledged Network Service Access Point Identifier (NSAPI) network packet data unit (N-PDU) numbers, and recovering outstanding unacknowledged NSAPI requests, comprising the acts of:
   receiving, from a Logical Link Control (LLC) layer, a logical link reset indication (LL-RESET-indication) at the SNDCP;
   upon receipt of the LL-RESET-indication, the performing the following acts at the SNDCP:
      resetting all SNDCP XID parameters to their default values;
      for every network service access point identifier (NSAPI) using unacknowledged peer-to-peer LLC operation, setting a sequence number of the next N-PDU to be sent by the SNOOP to zero; and if the NSAPI is using unacknowledged peer-to-peer LLC operation: transmitting outstanding SNDCP-to-LLC requests to the LLC.

9. A method of layer-2 recovery comprising the acts of:

identifying a layer-2 reset condition in layer-3;

after identifying the layer-2 reset condition, identifying outstanding layer-3 to layer-2 requests for unacknowledged layer-2 communication; and resending outstanding layer-3 to layer-2 requests from layer-3 to layer-2;

upon identifying the reset condition in layer-3;

setting unacknowledged layer-2 communication sequence numbers to zero in layer-3; and entering a recovery state in layer-3 for acknowledged layer-2 communications.

10. A mobile station, comprising:

a receiver;

a transmitter;

an antenna coupled to the receiver and the transmitter;

one or more processors including:

a layer-2 module which interfaces with the receiver and the transmitter;

a layer-3 module which interfaces with the layer-2 module;

the layer-3 module being operative to facilitate data communication for the mobile station by sending a plurality of requests to a queue of the layer-2 module, each request being a type that is acknowledged by the layer-2 module but unacknowledged by a destination node; and the layer-3 module being further operative to resend one or more requests that are unacknowledged by the layer-2 module in response to a reset indication;

the layer-3 module being further operative to set, in response to the reset indication at the layer-3 module, a packet data unit (PDU number to zero for use in resending the one or more requests.

11. The mobile station of claim 10, wherein the requests comprise unacknowledged Network Layer Service Access Point Identifier (NSAPI) requests.

12. The mobile station of claim 10, further comprising:

the layer-2 module comprising a Logical Link Control (LLC) layer; and the layer-3 module comprising a recovering Sub-Network Dependent Convergence Protocol (SNDCP) layer.

13. A method of communicating data comprising:

facilitating data communication by sending a plurality of requests from a layer-3 module to a queue of a layer-2 module, each request being a type that is acknowledged by the layer-2 module but unacknowledged by a destination node; and in response to a reset indication, resending one or more requests that are unacknowledged by the layer-2 module;

in response to the reset indication at the layer-3 module, setting a packet data unit (PDU number to zero for use in resending the one or more requests.

14. The method of claim 13, wherein the requests comprise unacknowledged Network Layer Service Access Point Identifier (NSAPI) requests.

15. The method of claim 13, wherein the layer-2 module comprises a Logical Link Control (LLC) layer and the layer-3 module comprises a recovering Sub-Network Dependent Convergence Protocol (SNDCP) layer.

* * * * *